April 24, 1962 G. ORD ET AL 3,031,587

TWO-STATE ELECTRONIC CIRCUITS

Filed April 21, 1959 2 Sheets-Sheet 1

Geoffrey Ord
Peter L. Lewis
*Inventors*

By Cushman, Darby & Cushman
*Attorney*

April 24, 1962 G. ORD ET AL 3,031,587

TWO-STATE ELECTRONIC CIRCUITS

Filed April 21, 1959 2 Sheets-Sheet 2

Geoffrey Ord
Peter L. Lewis
*Inventors*

By Cushman, Darby & Cushman
Attorney

United States Patent Office 3,031,587

Patented Apr. 24, 1962

3,031,587

TWO-STATE ELECTRONIC CIRCUITS

Geoffrey Ord, Malvern Wells, and Peter Lawley Lewis, Great Malvern, England, assignors to National Research Development Corporation, London, England, a British corporation Filed Apr. 21, 1959, Ser. No. 807,869
Claims priority, application Great Britain Apr. 22, 1958
11 Claims. (Cl. 307—88.5)

Figure 1:
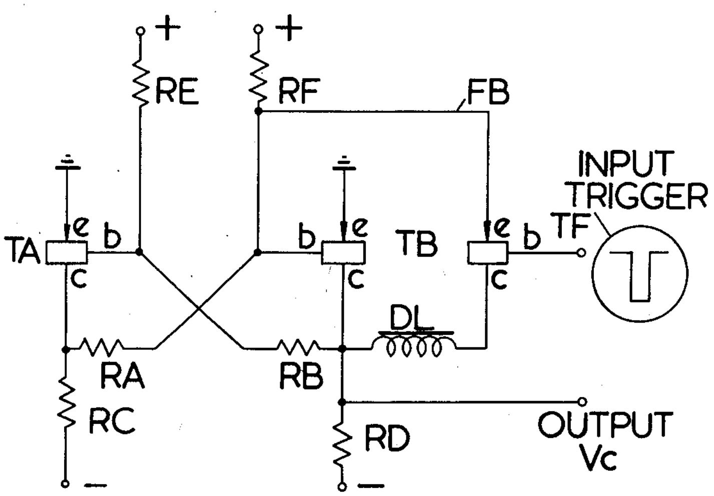

This invention relates to two-state electronic circuits and has reference to two-state circuits employing transistors as switching elements.

A simple two-state transistor circuit can be made by inter-coupling two transistors so that, in operation, when one transistor is conducting the other is in its cut-off condition, and vice-versa. Circuits of this kind can be arranged to be triggered, from one state to the other and back again by pulses from an external source, and so to provide divide-by-two counters.

It is an object of the present invention to provide a versatile two-state circuit suitable for use as a divide-by-two counter and to provide a two-state circuit which can operate as a high-speed counter.

According to the invention a two-state circuit comprises two sub-circuits, each comprising a transistor with an associated load impedance, intercoupled output to input and input to output, a feedback path feeding between the output and input or a first sub-circuit and switching means for opening and closing the feedback path in response to pulses from an external source, the feedback path being arranged when closed to feed a signal from output to input which changes the state of the transistor and to delay further feedback due to the resulting change of state in the time elapsing before the pulse from the external source has ended, whereby in operation, the circuit changes state in response to the pulses and an output pulse appears in each load impedance for every two pulses from the external source.

Conveniently, and for simplicity, the switching means comprises a transistor connected with its emitter-collector circuit in series with the feedback path, the pulses from the external source being connected at its base. The transistor, here, takes advantage of its symmetry in that its emitter and collector functions interchange according to the polarities to which they are subjected in the circuit; a thermionic valve alone would not have this property. Thus simplicity and high-speed operation are together ensured.

A shift register may be provided by connecting in cascade a plurality of two-state circuits according to the invention, a fourth transistor being provided in each circuit to connect by means of its emitter-collector circuit the input of the second sub-circuit through a delay means to the output of the first sub-circuit of the succeeding two-state circuit, whereby a shift pulse applied to the base of the fourth transistor effects a backward shift of the state from the succeeding circuit.

By the addition of an unswitched feedback coupling to a simple two-state circuit it is possible to arrange for a two-state circuit to be self-running; that is, after completing a cycle of changes of state, the circuit returns to its original state and a signal is automatically provided to reinitiate a fresh cycle, and so on.

Another object is therefore to provide a simple, self-running two-state circuit.

According to the invention in another aspect a two-state circuit comprises two sub-circuits, each comprising a transistor with an associated load impedance, intercoupled output to input, input to output, and a feedback path comprising a delay network feeding between the output and input of one sub-circuit so that in the one sub-circuit each change of state of the transistor initiates a further change of state.

Conveniently the feedback path comprises a delay line connected between the base and collector of the sub-circuit transistor.

Figure 2:
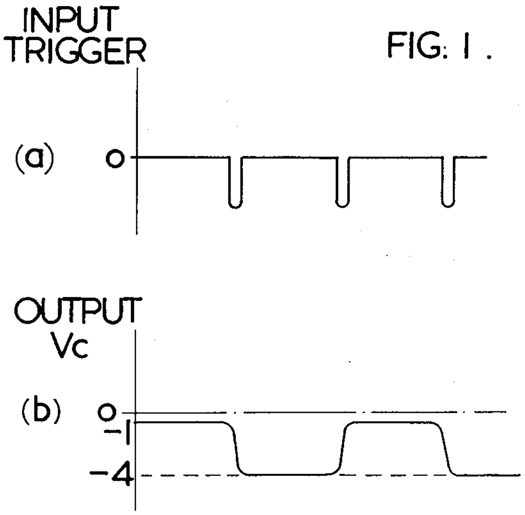
Figure 3:
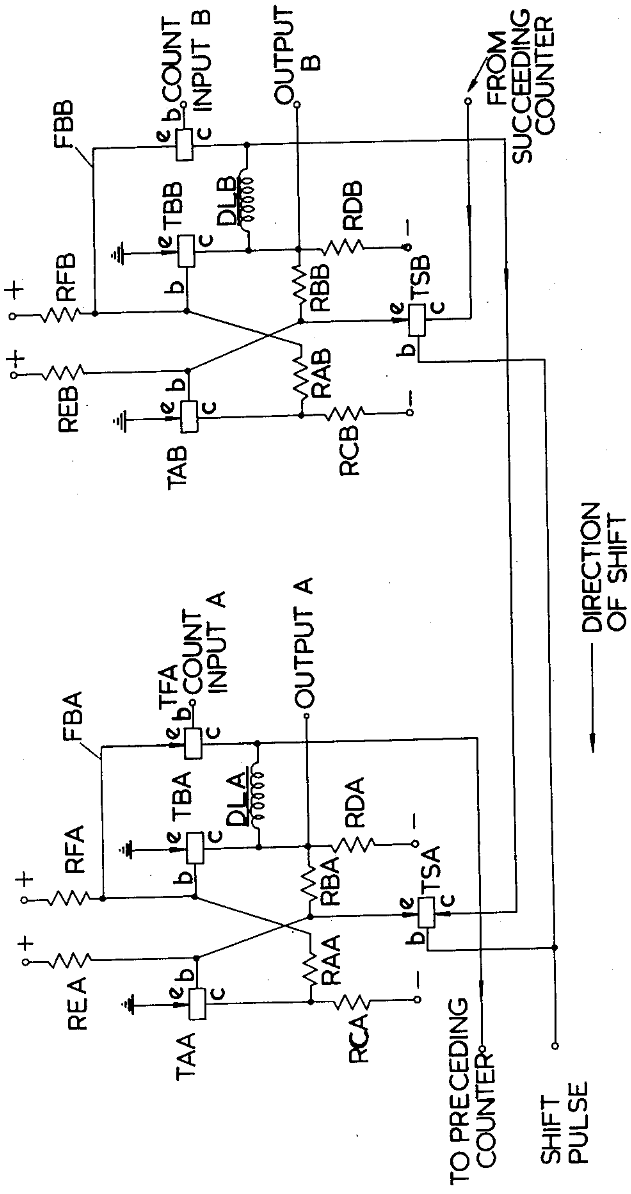

In order to make the invention clearer a divide-by-two counting circuit according to the invention will now be described by way of example reference being made to the accompanying drawings in which:

FIG. 1 shows schematically the circuit arrangement of a counting circuit according to the invention, FIG. 2 shows waveform diagrams relating to the operation of the circuit of FIG. 1, and FIG. 3 shows schematically the arrangement of two counting circuits to form two stages of a shift register.

In FIG. 1 transistors TA and TB are intercoupled; to this end the base of the transistor TA is connected via a resistor RB to the collector of the transistor TB and the base of the transistor TB is connected via a resistor RA to the collector of the transistor TA. Load resistors RC and RD are connected in the negative supplies to the collectors of the transistors TA and TB respectively. The bases of the transistors TA and TB are fed from a positive source via resistors RE and RF respectively. A feedback path FB between the base and the collector of the transistor TB is made up of a delay line DL and the emitter and collector circuit of a transistor TF. An Input Trigger terminal is provided and connected to the base of the transistor TF. An Output terminal is connected to the collector of the transistor TB.

The arrangement of the transistors TA and TB, neglecting for the moment the feedback path FB containing the transistor TF, can be recognised as a simple two-state circuit. In operation the transistor TA conducts whilst the transistor TB is cut off, and vice versa.

The transistor TF and the delay line DL complete the feedback path FB, from the collector to the base of the transistor TB, which is controlled by input pulses applied at the Input Trigger terminal. The input pulses drive the base of the transistor TF momentarily negative with the result that irrespective of the relative polarities of the base and collector of the transistor TB the transistor TF conducts.

Thus, if we assume that the transistor TA is conducting and the transistor TB is cut off, the application of an input pulse results in the negative potential of the collector of the transistor TB being applied to the base of the transistor TB.

When the base of the transistor TB is driven negatively due to the closing of the feedback path FB the transistor TB commences to conduct and the voltage at its collector rises rapidly to somewhere around earth potential; the base of the transistor TA which is connected to the collector of the transistor TB via the resistor RB is thereupon driven positively and the transistor TA ceases to conduct and is cut off; its collector voltage rises and is fed to the base of the transistor TB via the resistor RA to maintain the transistor TB conducting. It is assumed that the input pulse is shorter than the delay time of the delay line DL so the delay line DL ensures that the change of state of the transistor TB does not effect still further and unwanted changes. The result is then that the state of the circuit is changed, the transistor TA is now cutoff and the transistor TB is now conducting. The circuit is now in a stable state.

The arrival of a further input pulse again drives the base of the transistor TF negatively and the feedback path FB is again closed to connect the collector of the transistor TB to its base. This time, however, the collector of the transistor TB is at somewhere near earth potential and so the base of the transistor TB is driven towards earth potential and the transistor TB ceases to conduct.

When the transistor TB is no longer conducting its collector potential becomes negative with the result that the base of the transistor TA is also driven negatively. The transistor TA now conducts and its collector voltage approaches earth potential; the base of the transistor TB is thus held for the transistor TB to be maintained in its cut-off state although the feedback path FB is no longer closed and in operation, the input pulse having already ceased. The circuit is again in a stable state, in fact, the original state with the transistor TB cut off and the transistor TA conducting.

The sequence of events just described will continue so long as input pulses are applied to the Input Trigger terminal. Each input pulse changes the state of the circuit and a signal appears at the Output terminal which represents the changes of voltage of the collector of the transistor TB. If after one pulse the voltage at the Output terminal is near earth potential for instance then after the following input pulse it will be much more negative. Negative-going pulses are thus produced at the Output terminal; and it will be appreciated that the negative-going pulses occur at half the recurrence rate of the input pulses applied to the Input Trigger terminal.

Typical waveform diagrams for the circuit of FIG. 1 are given in FIG. 2 where the graph (*a*) shows the input pulses applied to the Input Trigger terminal and the graph (*b*) shows the resulting excursions of the collector voltage which provide output pulses at the Output terminal at half the recurrence rate of the input pulses. In typical operation conditions the input pulses occur at a frequency of 8 mc./s. In these circumstances the delay time due to the delay line DL was equal to 60 m$\mu$ sec.

It will be appreciated by those skilled in the circuit art that as described above the transistor TB (FIG. 1) saturates when it is conducting i.e. its base potential is then such as to ensure saturation.

In the practical design of cross-coupled bistable circuits it is usually arranged that the current I*c* flowing from the collector of a transistor (e.g. TB of FIG. 1) is limited to a value less than $\alpha$I*e* where $\alpha$ is the current $\alpha$ of the transistor and I*e* is the emitter current. This is discussed at greater length in the book, "Introduction to Transistor Circuits" by E. H. Cooke-Yarborough published by Inter-Science Publications Inc., New York, 1957, see particularly the discussion of the Cross-coupled Bistable Circuit at the bottom of page 79.

Thus the circuit of FIG. 1 described above is normally designed to ensure that the transistor TB saturates in its conducting state. Then there is a practical point that, according to the characteristics of the transistor TF, a small bias voltage may be needed in the emitter-collector circuit of that transistor.

An alternative or further output terminal may be connected to the collector of the transistor TA.

It is expected that input pulse frequencies of up to 15 mc./s. may be used.

In situations where the output pulses at the Output terminal are longer than considered desirable a differentiating circuit can be connected to the Output terminal and a polarity-sensitive circuit used to select output spikes of one polarity from the differentiating circuit.

The counter circuit of the present invention has application in the construction of a high speed shifting register to form part of the arithmetical section of a very high-speed computer. In these circumstances a number of two-state circuits of the kind described above may be connected in cascade as shown in FIG. 3. In FIG. 3 corresponding components of each counter circuit are designated similarly to assist identification.

In making the cascade connections an additional transistor TSA for the left-hand counter and (TSB for the right-hand counter) connects via its emitter-collector circuit the base of the transistor TAA (or TAB), to the collector of the transistor TBB (or TBC), of the succeeding (to the right) counter via the delay line DLB (or DLC) of that counter. A common connection to a Shift Pulse terminal is made to the bases of the additional transistors TSA, TSB.

In operation the application of a shift pulse to the base of the transistor TSA renders it conducting and the potential existing at the collector of the transistor TBB is applied via the delay line DLB to the base of the transistor TAA of the left-hand counter. Thus, whatever the state of the transistor TBB—and this determines the state of the right-hand counter—that state is transferred to the left-hand counter by the application of an appropriate potential to the base of the transistor TAA through the transistor TSA. Similar action occurs in each counter of the cascade, the delay lines DLA, DLB, . . . preventing any of the changes of state from causing unwanted further changes before the shift pulse ceases. Repetition of the shift pulse causes further successive shifts to the left along the cascade.

Counting may be performed by pulses applied to the bases of the transistors TFA, TFB, . . . at terminals Count Input A and B respectively and information in binary parallel form may be inserted into the register at these terminals.

A free-running oscillator is obtained if in the circuit of FIG. 1 the transistor TF in the feedback path FB is omitted and the path FB comprises only the delay line DL. The frequency of operation of the oscillator using a 60 m$\mu$ sec. delay line was typically 1 mc./s. and output pulse edges of 13 and 20 m$\mu$ sec. were obtained.

We claim:

1. A two-state circuit comprising two sub-circuits, each comprising a transistor having a load impedance, intercoupled output to input and input to output, wherein a bi-directional feedback path including a delay device feeds between the output and input of a first sub-circuit and switching means are provided for opening and closing the feedback path in response to pulses from an external source, the feedback path thus being arranged when closed to feed a signal from output to input of the sub-circuit which changes the state of the transistor and to delay further feedback due to the resulting change of state in the time elapsing before the pulse from the external source has ended, whereby in operation, the circuit changes state in response to the pulses and an output pulse appears in each load impedance for every two pulses from the external source.

2. A two-state circuit as claimed in claim 1, wherein the switching means comprises a switching transistor connected with its emitter-collector circuit in series with the feedback path and connected at its base to the external source of pulses.

3. A two-state circuit as claimed in claim 2, wherein the delay device of the feedback path comprises a delay line network connected between the output of the first sub-circuit and the switching transistor.

4. A shift register comprising a plurality of two-state circuits according to claim 1, connected in cascade, wherein a fourth transistor is provided, its base being connected to a source of shift pulses and its emitter-collector circuit connecting the input of the second sub-circuit through a delay means to the output of the first sub-circuit of the succeeding two-state circuit, whereby a shift pulse applied to the base of the fourth transistor effects a backward shift of the state from the succeeding circuit.

5. A shift register comprising a plurality of two-state circuits according to claim 1, connected in cascade, wherein in each circuit the delay device is connected between the output of the first sub-circuit and the switching means and a fourth transistor is provided, its base being connected to a source of shift pulses and its emitter-collector circuit connecting the input of the second sub-circuit through a delay means to the output of the first sub-circuit of the succeeding two-state circuit, whereby a shift pulse applied to the base of the fourth transistor effects a backward shift of the state from the succeeding circuit.

6. A shift register as claimed in claim 5, wherein the bases of the fourth transistors are together, to be connected together, to be to a common source of shift pulses.

7. A shift register comprising a plurality of two-state circuits according to claim 3, connected in cascade, wherein a fourth transistor is provided in each circuit, its base being connected to a source of shift pulses and its emitter-collector circuit connecting the input of the second sub-circuit through a delay means to the output of the first sub-circuit of the succeeding two-state circuit, whereby a shift pulse applied to the base of the fourth transistor effects a backward shift of the state from the succeeding circuit.

8. A shift register as claimed in claim 7, wherein the bases of the fourth transistors are connected to a common source of shift pulses.

9. A two-state circuit as claimed in claim 1, wherein means are provided for differentiating output pulses from one of the load impedances and applying them to a polarity sensitive circuit which selects differentiated pulses of only one polarity.

10. A two-state circuit as claimed in claim 3, wherein means are provided for differentiating output pulses from one of the load impedances and applying them to a polarity sensitive circuit which selects differentiated pulses of only one polarity.

11. A shift register comprising a plurality of two-state circuits according to claim 3, connected in cascade, wherein a fourth transistor is provided in each circuit, its base being connected to a source of shift pulse and its emitter-collector circuit connecting the input of the second sub-circuit through the delay line network of the succeeding two-state circuit to the output of the first sub-circuit of the succeeding two-state circuit, whereby a shift pulse applied to the base of the fourth transistor effects a backward shift of the state from the succeeding circuit.

References Cited in the file of this patent

UNITED STATES PATENTS

| | | |
|---|---|---|
| 2,436,808 | Jacobsen et al. | Mar. 2, 1948 |
| 2,511,093 | Atwood | June 13, 1950 |
| 2,596,956 | Nierman | May 13, 1952 |
| 2,823,322 | Trousdale | Feb. 11, 1958 |
| 2,845,548 | Sillman | July 29, 1958 |
| 2,883,562 | Graham | Apr. 21, 1959 |
| 2,906,892 | Jones | Sept. 29, 1959 |
| 2,906,894 | Harris | Sept. 29, 1959 |
| 2,907,898 | Clark | Oct. 6, 1959 |

OTHER REFERENCES

"Transistor Switching Circuits" by Smith, Electronic Design, October 1, 1957, pages 24 to 27.

"Transistor Circuits" by Rubinoff, Electronics, June 1955, pages 133–136.

"Arithmetic Operations in Digital Computers" by Richards, published by Van Nostrand Co., New York, 1955, pp. 47, 48 and 145.